(12) United States Patent
Delapierre et al.

(10) Patent No.: US 9,512,724 B2
(45) Date of Patent: Dec. 6, 2016

(54) METHOD FOR REPAIRING WEAR MARKS ON A ROTOR SUPPORTING THE FAN OF A BYPASS ENGINE

(71) Applicant: SNECMA, Paris (FR)

(72) Inventors: Michael Delapierre, Vincennes (FR); Eric Gvozdenovic, Coutencon (FR); Christian Manuel Planas, La Rochette (FR); Patrick Jean-Louis Reghezza, Vaux le Penil (FR)

(73) Assignee: SNECMA, Paris (FR)

( * ) Notice: Subject to any disclaimer, the term of this patent is extended or adjusted under 35 U.S.C. 154(b) by 169 days.

(21) Appl. No.: 14/374,282

(22) PCT Filed: Jan. 28, 2013

(86) PCT No.: PCT/FR2013/050177
§ 371 (c)(1),
(2) Date: Jul. 24, 2014

(87) PCT Pub. No.: WO2013/114032
PCT Pub. Date: Aug. 8, 2013

(65) Prior Publication Data
US 2015/0040395 A1 Feb. 12, 2015

(30) Foreign Application Priority Data
Jan. 31, 2012 (FR) ...................... 12 50887

(51) Int. Cl.
*F01D 5/00* (2006.01)
*F01D 5/06* (2006.01)
(Continued)

(52) U.S. Cl.
CPC ............... *F01D 5/005* (2013.01); *B23P 6/002* (2013.01); *F01D 5/06* (2013.01); *F01D 5/30* (2013.01);
(Continued)

(58) Field of Classification Search
CPC .......... F01D 5/005; F01D 5/066; B23P 6/002; F02K 3/00; Y10T 29/49908; Y10T 29/49911; Y10T 29/49913; Y10T 29/49909; Y10T 29/49943; Y10T 29/49954; Y10T 29/49956; Y10T 29/49718; Y10T 29/49734
See application file for complete search history.

(56) References Cited

U.S. PATENT DOCUMENTS 1,955,728 A * 4/1934 Allen .................... B23P 11/025
29/282
4,604,033 A * 8/1986 Surdi ...................... F01D 5/323
416/220 R
(Continued)

FOREIGN PATENT DOCUMENTS

FR 2 948 725 A1 2/2011

OTHER PUBLICATIONS

International Search Report issued Apr. 23, 2013, in PCT/FR2013/050177, filed Jan. 28, 2013.

Primary Examiner — Jason L Vaughan
Assistant Examiner — Amanda Meneghini
(74) Attorney, Agent, or Firm — Oblon, McClelland, Maier & Neustadt, L.L.P.

(57) ABSTRACT

A method for repairing a flange of a rotor, to a transverse surface of which a disk of a fan in an upstream turbo-fan engine is attached. The flange includes, in a form of a ring, openings for connecting to the disk and intermediate discharge openings. Wear marks are formed by friction of the fan blades on the flange. The method includes machining spot facings onto the flange, in areas with wear marks; placing anti-wear slugs in the discharge openings that can be covered by the blades during friction; and the spot facings extend between the connection openings and are circumfer- (Continued)

entially limited by clamping surfaces of the connection between the disk and the flange.

12 Claims, 2 Drawing Sheets

(51) Int. Cl.
  *F01D 5/30* (2006.01)
  *F04D 29/32* (2006.01)
  *B23P 6/00* (2006.01)

(52) U.S. Cl.
  CPC ........... *F01D 5/3007* (2013.01); *F01D 5/3092* (2013.01); *F04D 29/322* (2013.01); *B23P 6/005* (2013.01); *F05D 2260/941* (2013.01); *Y02T 50/672* (2013.01); *Y10T 29/49318* (2015.01)

(56) References Cited

U.S. PATENT DOCUMENTS

| | | | |
|---|---|---|---|
| 6,910,866 B2* | 6/2005 | Bassot | F01D 5/3007 416/220 R |
| 2011/0027093 A1* | 2/2011 | Delapierre | F01D 5/06 416/220 R |
| 2011/0176921 A1* | 7/2011 | Gignoux | B23P 6/005 416/204 A |

* cited by examiner

METHOD FOR REPAIRING WEAR MARKS ON A ROTOR SUPPORTING THE FAN OF A BYPASS ENGINE

FIELD OF THE INVENTION

The present invention relates to the field of gas turbine engines and in particular to a jet engine having a front-mounted fan.

PRIOR ART

The rotor of the fan of a multi-flow jet engine fitted to civilian aircraft comprises a disk driven by the low-pressure shaft and at the periphery of which a plurality of blades, extending radially with respect to the axis of the engine, are held by their end that forms the dovetail cross section and these are accommodated in individual slots machined in the rim of the disk in a substantially axial direction. Immediately downstream of the fan disk, and making up the same rotor, is the boost compressor. This is in the form of a drum and comprises several blade stages.

In one embodiment, the fan disk is secured to the drum of the boost compressor by being bolted to a radial flange forming the upstream face thereof. The flange is also scalloped to form a means of axially holding the blades of the fan disk. To that end, each blade root, on its downstream side, is provided with an axial extension, termed a hook, having two radial lateral grooves. The hook is engaged in a scallop in the flange of the boost compressor, mentioned above, at the radial grooves so as to be blocked against any axial movement.

When the engine is on the ground, the fan may be made to windmill by the action of the wind on the fan blades. This phenomenon causes a tangential deflection of the fan blades. The part of the blade that forms the shank, between the dovetail root and the platform, then rubs, via its downstream transverse edge, against the upstream flange of the drum of the boost compressor. This movement thus leads to friction causing wear which has been noted on the upstream face of the flange in the regions located in the continuation of the fan disk slots.

Once this wear exceeds a certain depth it may have an impact on the life of the components on one hand and on the other hand on their integrity in the event of the loss of a blade.

One problem associated with this phenomenon of wear stems from the presence, in these regions, of drillings which have been made to relieve the mechanical stresses in the flange. These holes, referred to as stress-relief holes, are generally closed by simple plastic plugs. The blade bearing against the flange in a region that has drillings is itself subject to erosion. Shank wear is therefore not uniform. The surface of the downstream face of the shank becomes worn only where it comes into contact with the flange; the surface portion that faces the drilling does not become worn and in the long term becomes prominent. In addition to this phenomenon of blade wear, play develops between the blades and the flange.

The present applicant has proposed arranging an elastic buffer between the flange and the shank of the blade so as to avoid this contact. Such a solution, described in EP 1 873 401, does not however resolve the case in which wear marks are present on the flange.

Solutions for repairing the flange have been proposed. These firstly consist in eliminating the worn regions, by spot facing and then by reconstructing the reference surface facing the blade root. This latter operation uses plugs, known as anti-wear plugs, which are fitted tightly into the stress-relief holes of the drum.

The anti-wear plugs may be made of composite materials or of metal. The former have the advantage of wearing away far less rapidly than the latter. They are also easier to remove when they need changing. By contrast, they do not have sufficient mechanical integrity when fitting the blades. For this reason, the anti-wear plugs are generally made of metal, but with a risk of damaging the drum during the fitting and removal operations that are needed to check the material health of the boost compressor drum stress-relief holes.

Specifically, the disadvantages are as follows:
There is a risk of creating defects when fitting the plugs.
Fitting the plugs is a tricky operation because the plug has to be a sliding fit in the orifice but a minimal shrinkage has to be observed in order to guarantee that it will remain in its housing during operation. This is achieved by a heating of the drum combined with a cooling of the plug. A significant temperature difference, in excess of 300° C., is needed.
Repairs are expensive requiring the machining of as many spot faces as there are fan blades, and an equivalent number of assembly operations.
Repairs have to be carried out at a specialist workshop which means down-time for the component, or even for the engine.
The drilling in the drum has to be re-bored for each dismantling operation; that limits the number of replacements that can be done over the course of the life of the drum.

As an at least partial solution to these drawbacks, the applicant company proposed improvements that make it easier to fit the plugs; for example in Patent Application FR 2 929 660 the plug is in two parts, a metal part on the upstream side that is subjected to the friction stresses and a plastic part on the downstream side making fitting and removal operations easier. In the Patent Application FR 2 948 725, the plug is arranged in such a way that it can be fitted and removed just from the upstream side of the drum.

Patent Application FR 10 60 087 proposes fitting and interposing an annular shim between the disk and the flange, forming an axial bearing surface against which the blades accommodated in the slots may bear. This solution simplifies the repair of the rotors when wear marks, resulting from the rubbing of the blade roots, are detected. All that is needed is to replace the annular shim. The shim also forms a means for closing the stress-relief holes. It is thus not necessary to provide plugs for the latter. An annular channel may be machined in the flange in order to accommodate the shim. This solution is well suited to repairing a rotor which does not initially have an annular shim, an annular channel is machined with sufficient depth to remove the weakened parts of the component and an annular shim is put in place. In this manner, the cause of wear of the ring is removed and the reference surface between the disk and the ring is restored.

The applicant company has set itself the objective of developing another repair method. The objective is to carry out a repair which is reliable until the end of the life of the component. It is also to reduce fleet maintenance costs, the cost of repair must be less than the cost of replacement with a new component. It is also to eliminate wear on the front face of the flange without changing the axial position of the blade opposite.

DISCLOSURE OF THE INVENTION

These objectives are achieved by performing an optimized spot facing of the regions having a wear mark.

More precisely, and in accordance with the invention, the method relates to repairing a flange of a rotor on the transverse face of which there is attached a disk of a fan in an engine having an upstream turbofan, the flange comprising, arranged in a ring, openings for connecting to the disk and, between these, openings termed stress-relief openings, wear marks being formed by the fan blades rubbing on the flange.

The method, comprising a step of machining spot faces on the flange in the regions having wear marks and a step of putting in place pegs, known as anti-wear pegs, in the stress-relief openings which are likely to be covered by the blades during rubbing, is characterized in that the spot faces extend between the connection openings and are limited in the circumferential direction by the clamping regions or surfaces of the connection between the disk and the flange.

By virtue of this feature, the clamping conditions between the fan disk and the flange are not called into question.

In accordance with another feature, each spot face between two connection openings being defined by two radially oriented borders, at least one of the borders is outside the stress-relief holes. Avoiding that the borders of the spot face pass through the stress-relief holes reduces the risk of creating regions of stress concentration which can initiate cracks.

Advantageously, the depth of the spot face is determined so as to obtain a sufficient spot facing base radius along said borders in order to avoid stress concentrations along said borders while limiting the reduction in the effective cross section.

More particularly, to the extent that the flange comprises radial scallops for receiving axial hooks of the blades, the radial borders extend radially as far as the base of the scallops. This solution makes it possible to not weaken the component in the event of a blade breaking. Indeed, the loss of a blade induces forces which tend to deform the flange at the scallops.

The base of the scallop having a chamfer, the flange's resistance to deformation in the event of the loss of a blade is further improved by limiting the depth of the spot face such that the depth of the latter is less than that of the chamfer.

According to another feature, an anti-wear peg, having a stem and a collar, is arranged by sliding assembly in the stress-relief opening which may be covered by a fan blade, the peg being made of metal. The sliding assembly aims to reduce the risk of damage to the flange. Indeed, a metal peg offers better resistance to forces and to impacts such as those which act on the collar when fitting the blades. Moreover, the sliding assembly being associated with sufficient space around the stem of the peg during assembly limits the risk of an impact and of creating grooves which can initiate cracks.

Advantageously, the sliding assembly is created by shrink-fitting the stem of the peg in the stress-relief opening. In this case, the flange surface having undergone shot peening, the heating of the flange has been adjusted in terms of temperature and time so as to not relieve the residual stresses from the shot peening.

In accordance with another solution which avoids the risk of damage to the flange, the stem of the peg being deformable in the radial direction, a plug for radially stretching the stem is arranged on the side opposite the collar. Alternatively, the stem of the peg being deformable in the radial direction, the stem is pinched such that it can be inserted into the opening, after which the pinching is released.

BRIEF DESCRIPTION OF THE FIGURES

Other features and advantages will emerge from the following description of non-limiting embodiments of the invention, with reference to the appended drawings, in which.

DETAILED DESCRIPTION OF EMBODIMENTS OF THE INVENTION

Figure 1:
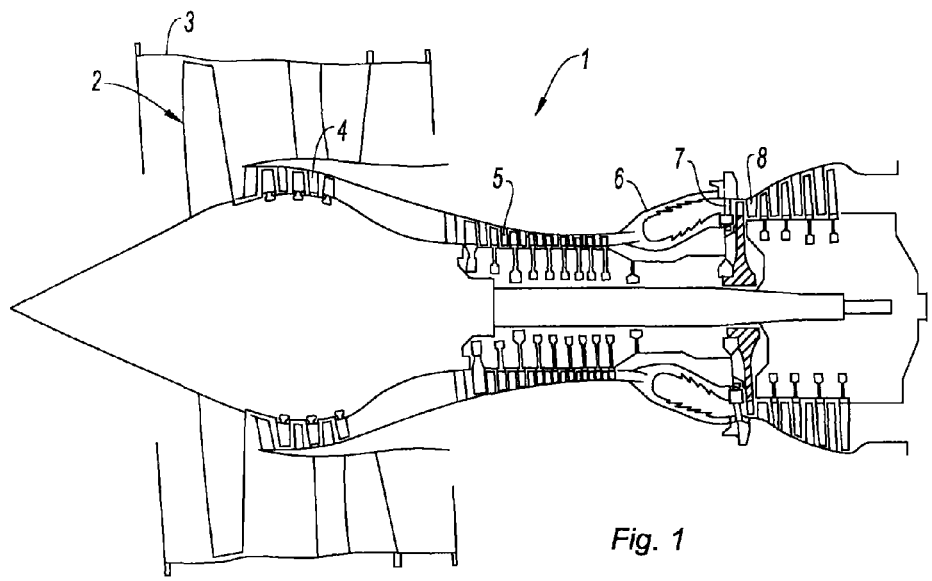
FIG. 1 shows, in axial section, a jet engine to which the invention applies.

FIG. 1 shows, in axial section, a twin-spool bypass jet engine 1. It comprises, upstream, a front fan 2 with a ducted rotor in a fan casing 3 which delimits the secondary flow stream. The rotor 2 of the fan is secured to a low-pressure compressor 4, also termed boost compressor. The assembly consisting of the fan 2 and the boost compressor is secured, via the intermediary of a central shaft, to a downstream turbine assembly forming the low-pressure turbine 8.

Downstream of the boost compressor 4, the air is further compressed by the high-pressure compressor 5. The latter is secured in rotation to the high-pressure turbine stage 7 which drives it. The compressed air enters into the combustion chamber 6 which produces the hot gases for driving the turbine stages.

In this example, the invention relates to that part of the engine which is located between the fan rotor 2 and the rotor 4 of the low-pressure compressor.

Figure 2:
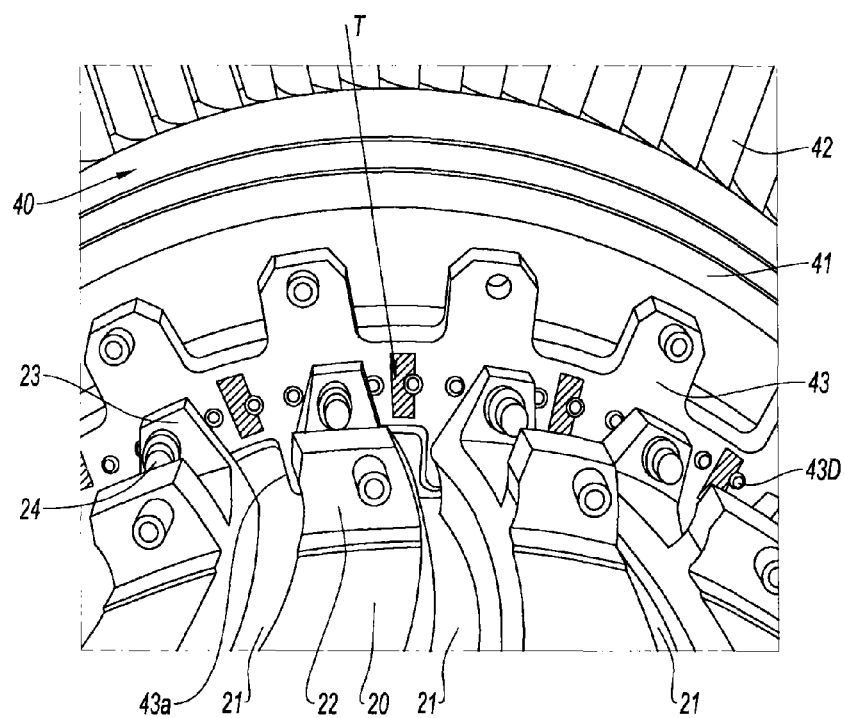
FIG. 2 shows, in perspective, the details of a rotor of the fan of a jet engine on the side of the upstream flange of the boost compressor.
Figure 3:
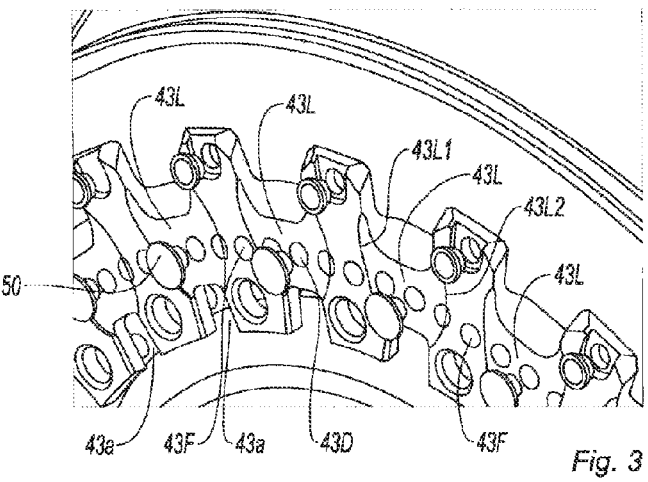
FIG. 3 shows, in perspective, the upstream flange of the drum of the compressor with spot facing regions.

FIG. 2 shows, in perspective and seen from upstream, the inside of this region in which, for the sake of clarity, the fan blades have been omitted.

The fan disk 20 comprises slots 21 on its rim. These are of axial overall orientation, that is to say in the axis of the engine, with in this case a curved shape. The slots have a dovetail cross section so as to hold the blades radially. The rim comprises transverse radial flanges 22 between the slots for attaching inter-blade platforms (not shown). The disk 20 is secured to the downstream low-pressure compressor 40, known as the boost compressor. The compressor 40 comprises a cylindrical drum 41 on which are attached the compressor blades 42 which are partially visible. In the upstream direction, the drum is secured to a radial transverse flange 43 which forms a ring and onto which the rim of the disk 20 is bolted. The rim comprises radial attachment flanges 23 between the slots 21. Each radial flange 23 is attached to the upstream flange 43 of the compressor by means of a bolt 24. It is noted that the holes present on the upstream flange 43 of the drum of the compressor do not all serve the same purpose: connection holes 43F make it possible to ensure the connection, by bolting, of the disk to the drum and stress-relief holes 43D protect the connection holes from the circumferential stress flow. The bolts 24 are accommodated in the connection holes 43F. The connection holes 43F are of slightly larger diameter than the stress-relief holes 43D. In this case, three stress-relief holes are provided between two connection holes. They are arranged on one and the same circular ring. Sealing plugs (not shown) block off the openings 43D and prevent the downstream air, inside the cavity of the drum, from escaping through the drillings in the upstream direction, where the pressure is lower. These sealing plugs are made of synthetic material and serve no other purpose.

The upstream flange 43 has holding scallops 43a which have radial edges and are open toward the axis of the machine. These scallops serve to hold the blades in the axial direction by inserting the hooks of the latter which are accommodated in the slots 21 located opposite. This method for holding the blades is described in the applicant company's patent EP 165 860.

When the engine is on the ground, the fan being made to windmill produces a tangential deflection of the fan blades. In such a case, the blades come to rub against the flange 43 via the downstream face of their shank. The pressure and the movements of the blades lead to wear both of the blade and of the upstream flange. The locations of the wear marks T left by the shanks of the blades on the flange 43 have been indicated on this rotor. These marks reproduce the shape of the cross section of the shanks of the blades, which is rectangular in shape. They are situated in the continuation of the slots in which the blades are accommodated and, in particular, overlap with stress-relief holes 43D.

Figure 4:
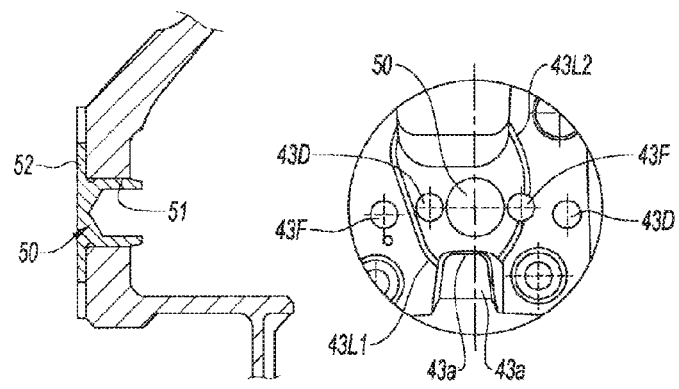
FIG. 4 shows the flange front on and, in section, the anti-wear peg fitted in a stress-relief hole.

There follows a description of the repair method of the invention. This involves machining an optimized spot face 43L in the region of each wear mark T, see FIG. 4. This spot face 43L is defined by its circumferential extent between two radial borders 43L1 and 43L2, its radial extent and its depth. Once the spot faces have been created, the surface of the flange 43 is reconstituted by putting in place anti-wear pegs 50 in the stress-relief openings 43D opposite the slots of the disk 20. These anti-wear pegs have a stem 51 which is accommodated in the corresponding hole and a collar 52 which presses against the base of the spot face 43L.

So as to not call into question the clamping conditions of the flanges 23 of the disk 20 on the flange 43 of the drum by means of the bolts 24, the circumferential extent of the spot faces is limited. In particular, the contact regions, via which the flanges 23 of the disk 20 are clamped to the flange of the drum, are not machined.

Furthermore, the optimization of the spot facing aims to not shorten the life of the component. To that end, at least one of the borders 43L1 and 43L2 is made to pass between two adjacent stress-relief holes 43D. This reduces, overall, the risk of cracks appearing at the intersection of the borders and the stress-relief holes.

Also in order to not shorten the life of the component, a compromise is struck between the depth of the spot face necessary in order that the blend radius along the borders and the reduction in the radial and circumferential effective cross section.

Optimization of the spot facing also takes into consideration the integrity of the component with respect to loads resulting from the loss of a blade. In the event of a blade loss, the regions located on either side of the scallops hold the blades in the axial direction and contribute directly to the flexibility of the downstream holding system. The extent of the spot face is therefore limited in the radial direction so as to minimize its impact on the axial flexibility of the downstream fan blade holding system. The radial edges of the scallop 43a are thus not machined, their thickness is unchanged.

With regard to the base of the scallop, in order to avoid a reduction in the contact surface between the hook of the blade and the base of the scallop, the depth of the spot face is limited to that of the existing chamfer at the intersection between the spot face and the base 43af of the scallop.

With regard to the depth of the spot face, it is deep enough to entirely remove the wear marks observed at the blade roots.

With regard to the anti-wear pegs 50 fitted in the stress-relief hole 43D opposite the slots of the disk, the following considerations are taken into account:

Maximizing the thickness of the collar so as to guarantee the mechanical integrity of the collar during fitting and in operation.

Choosing a metal material which is able to withstand the rigors of fitting and which has good wear behavior. It is apparent that a Ni-based alloy, such as Inconel 718, satisfies this condition.

Slide-fitting the pegs 50 in the openings 43D in order not to risk damaging or scratching the flange made of titanium alloy.

A sliding assembly which satisfies this condition is shrink-fitting. It involves cooling the peg by means of liquid nitrogen, combined with heating of the component to a temperature which is limited so as to not relieve the residual stresses from shot peening in the upper layers. An advantageous shrink-fitting involves cooling the peg made of Inconel 718 by means of liquid nitrogen to −196° C., combined with heating the component made of titanium alloy, such as TA6V, to between 250° C. and 350° C. for one hour.

Feasibility tests for the fitting have been carried out on 160 holes. No damage to the drum was observed when fitting the anti-wear pegs.

Alternative solutions to the shrink-fitting of the peg, with low risk of damage to the drum and without insertion into the stress-relief opening implying the heating of the component, are conceivable.

Figure 5:
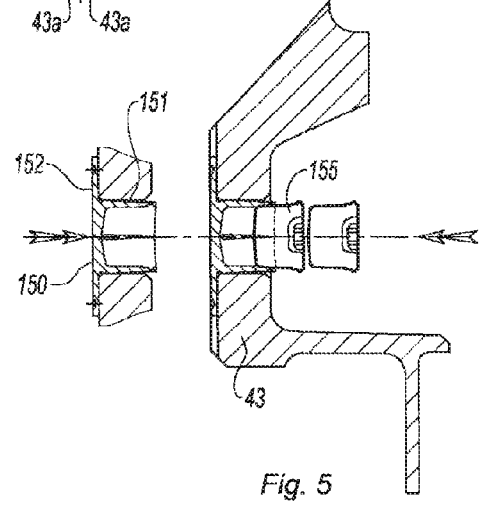
FIG. 5 shows a variant embodiment of the fitting of the anti-wear pegs with and without male locking element.

FIG. 5, for example, shows a solution for fitting a peg 150 with a stem 151 and a collar 152 which comprises a male element 155 which is placed in the stem by being introduced on the side opposite the collar. The stem is split in the longitudinal direction such that it can stretch in the radial direction. Once in place in the hole, the male element, which is slightly frustoconical, is guided axially in the stem which induces radial forces on the walls of the stem of the peg. Guidance can be obtained by screwing or by force-fitting.

According to another embodiment, the stem of the peg may be split and have a slightly flared shape. The peg is put in place by necking of the split edges of the stem by means of a suitable tool.

The invention claimed is:

1. A method for repairing a flange of a rotor on a transverse face of which there is attached a disk of a fan in an engine having an upstream turbofan, the flange including a ring shape, first openings to connect to the disk, and, between the first openings, stress-relief openings, wear marks being formed by fan blades rubbing on the flange, the method comprising:

machining spot faces on the flange in regions having the wear marks; and putting in place anti-wear pegs, in the stress-relief openings which are to be at least partially covered by the fan blades during rubbing of the fan blades on the flange, wherein the spot faces extend between the first openings, and at least one of the spot faces provides a gap in a circumferential direction between a periphery of one of the anti-wear pegs and a border of at least one clamping surface of connection between the disk and the flange.

2. The method as claimed in claim 1, wherein each spot face between two of the first openings is defined by two radially oriented borders, and at least one of the borders is outside the stress-relief openings.

3. The method as claimed in claim 2, wherein a depth of the spot face is determined to obtain a sufficient spot facing base radius along the borders to avoid stress concentrations along the borders while limiting a reduction in effective cross section of the flange in a spot facing region.

4. The method as claimed in claim 2, wherein the flange comprises radial scallops to receive axial hooks of the fan blades, according to which the radial borders extend radially as far as a base of the scallops.

5. The method as claimed in claim 4, wherein the base of the scallops includes a chamfer, according to which a depth of the spot face is limited such that the depth is less than that of the chamfer.

6. The method as claimed in claim 1, wherein at least one of the anti-wear ms includes a stem and a collar, and is arranged by sliding assembly in one of the stress-relief openings which is at least partially covered by one of the fan blades, the at least one of the anti-wear pegs being made of metal.

7. The method as claimed in claim 6, wherein the sliding assembly is created by shrink-fitting the stem of the at least one of the anti-wear pegs in the one of the stress-relief openings.

8. The method as claimed in claim 7, wherein a surface of the flange has undergone shot peening, and heating of the flange is carried out for a predetermined period and up to a predetermined temperature such that the surface of the flange does not relieve residual stresses from the shot peening.

9. The method as claimed in claim 6, wherein the stem of the at least one of the anti-wear pegs is deformable in a radial direction, and a plug to radially stretch the stem is arranged on a side opposite the collar.

10. The method as claimed in claim 6, wherein the stem of the at least one of the anti-wear pegs is deformable in a radial direction, and the stem is pinched such that the stem is insertable into the one of the stress-relief openings, after which the pinching is released.

11. A method for repairing a flange of a rotor on a transverse face of which there is attached a disk of a fan in an engine having an upstream turbofan, the flange including a ring shape, first openings to connect to the disk, and, between the first openings, stress-relief openings, wear marks being formed by fan blades rubbing on the flange, the method comprising:
  machining spot faces on the flange in regions having the wear marks; and
  putting in place anti-wear pegs, in the stress-relief openings which are to be at least partially covered by the fan blades during rubbing of the fan blades on the flange,
  wherein the spot faces extend between the first openings, and the spot faces are bounded in a circumferential direction by clamping surfaces of connection between the disk and the flange, and
  wherein each spot face between two of the first openings is defined by two radially oriented borders, and at least one of the borders is outside the stress-relief openings.

12. A method for repairing a flange of a rotor on a transverse face of which there is attached a disk of a fan in an engine having an upstream turbofan, the flange including a ring shape, first openings to connect to the disk, and, between the first openings, stress-relief openings, wear marks being formed by fan blades rubbing on the flange, the method comprising:
  machining spot faces on the flange in regions having the wear marks; and
  putting in place anti-wear pegs, in the stress-relief openings which are to be at least partially covered by the fan blades during rubbing of the fan blades on the flange,
  wherein the spot faces extend between the first openings, and the spot faces are bounded in a circumferential direction by clamping surfaces of connection between the disk and the flange,
  wherein at least one of the anti-wear pegs includes a stem and a collar, and is arranged by sliding assembly in one of the stress-relief openings which is at least partially covered by one of the fan blades, the at least one of the anti-wear pegs being made of metal, and
  wherein the sliding assembly is created by shrink-fitting the stem of the at least one of the anti-wear pegs in the one of the stress-relief openings.

* * * * *

UNITED STATES PATENT AND TRADEMARK OFFICE
CERTIFICATE OF CORRECTION

Page 1 of 1

PATENT NO. : 9,512,724 B2
APPLICATION NO. : 14/374282
DATED : December 6, 2016
INVENTOR(S) : Michael Delapierre et al.

It is certified that error appears in the above-identified patent and that said Letters Patent is hereby corrected as shown below:

In the Claims

Column 7, Line 21, change "ms" to --pegs--.

Signed and Sealed this
Twentieth Day of February, 2018

Andrei Iancu
*Director of the United States Patent and Trademark Office*